J. SCHMIT.
DRIVING AND STEERING MECHANISM.
APPLICATION FILED JUNE 26, 1918.
1,388,004.
Patented Aug. 16, 1921.
4 SHEETS—SHEET 1.
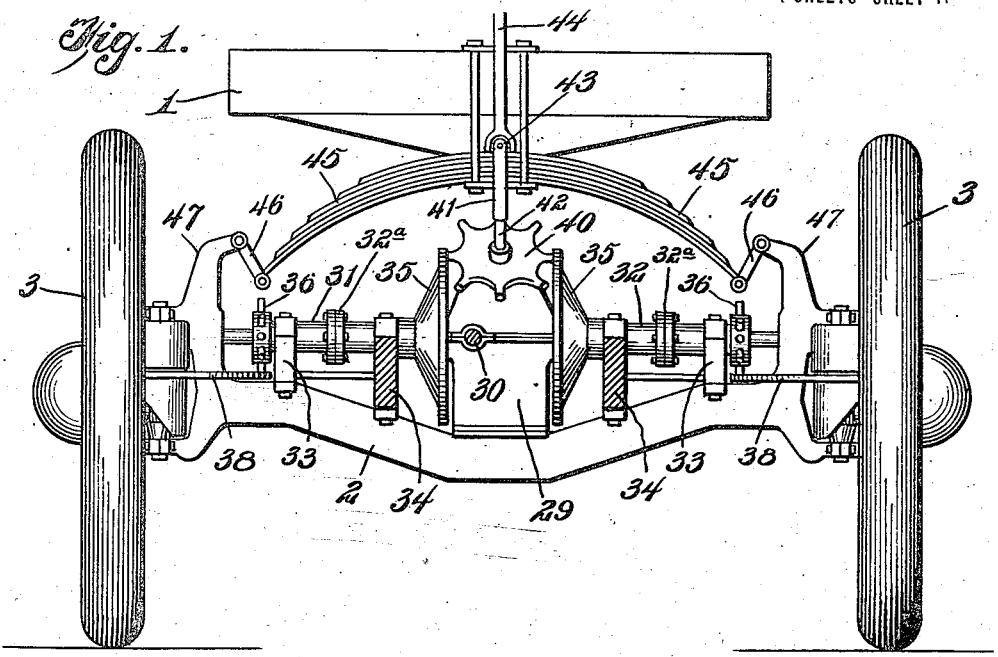
Fig. 1.
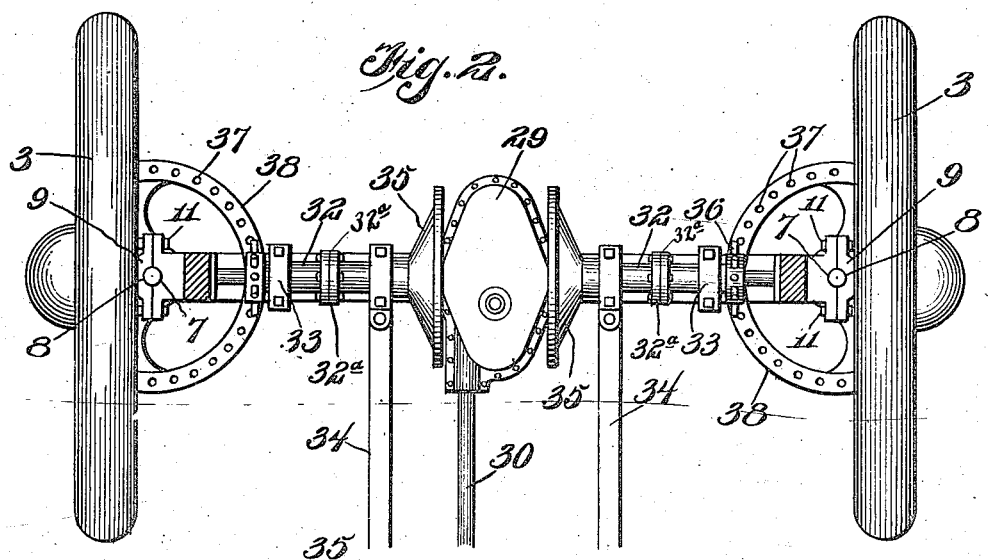
Fig. 2.
Fig. 3.
Inventor
Joseph Schmit
By
Attorney.

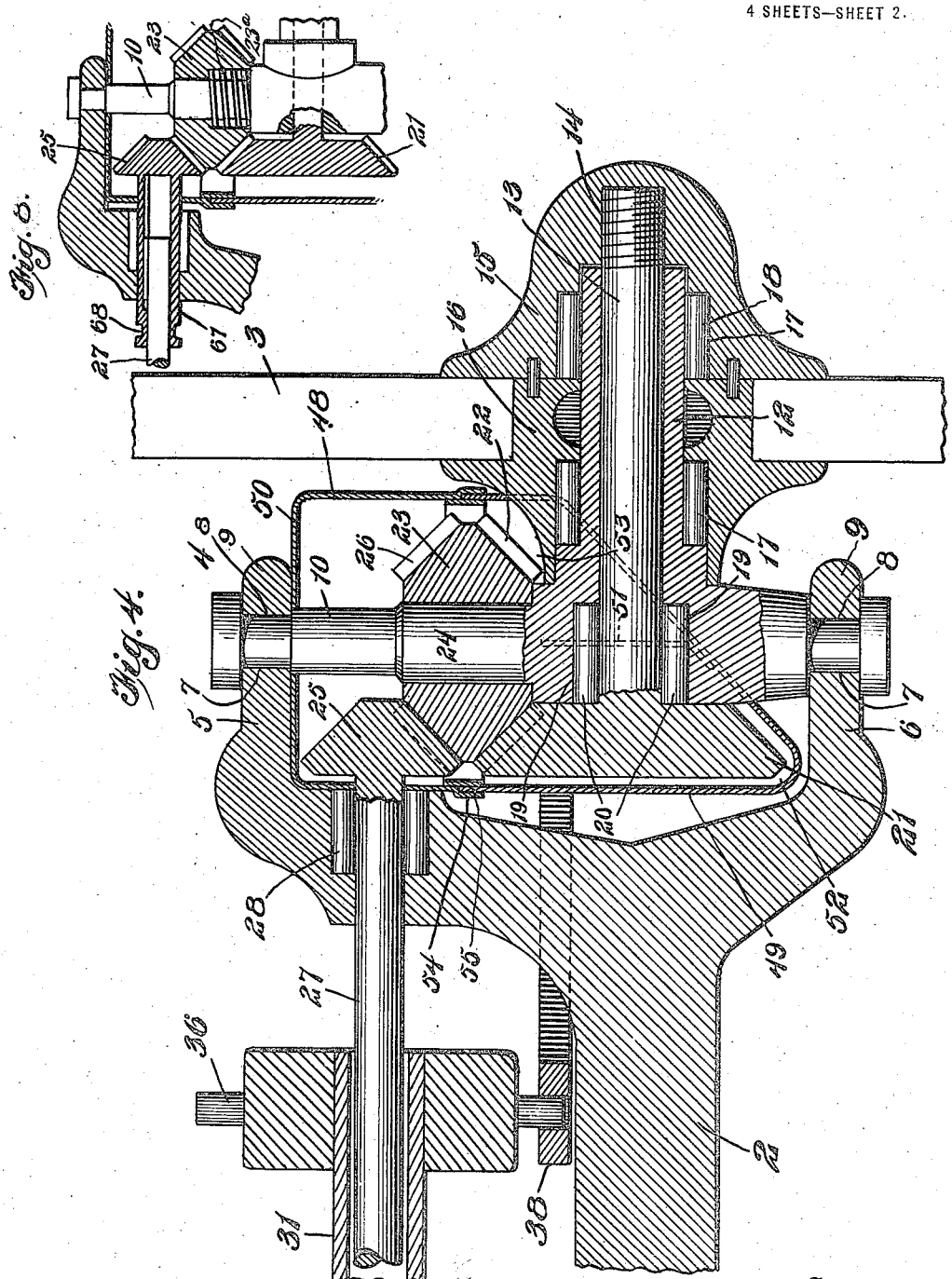

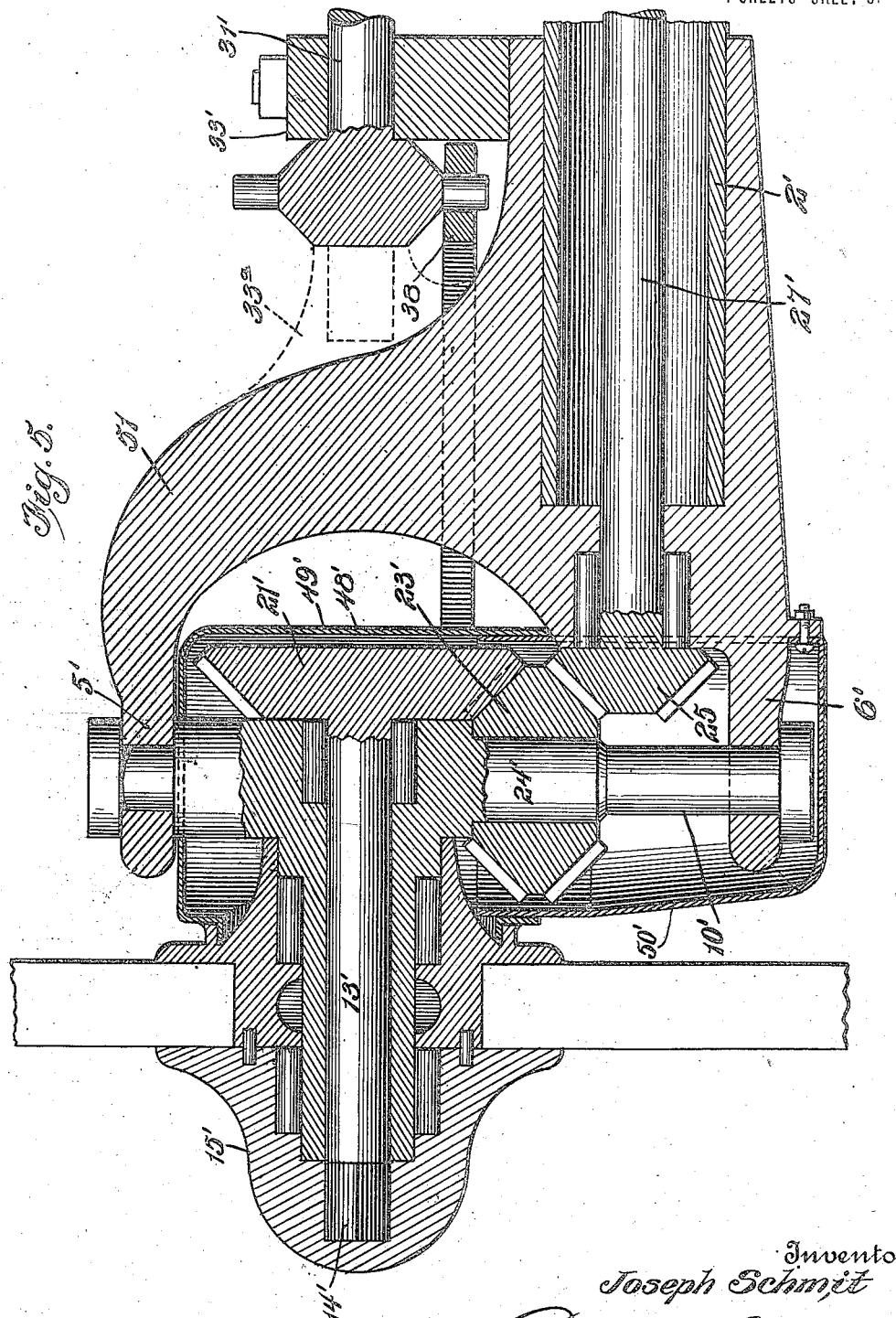

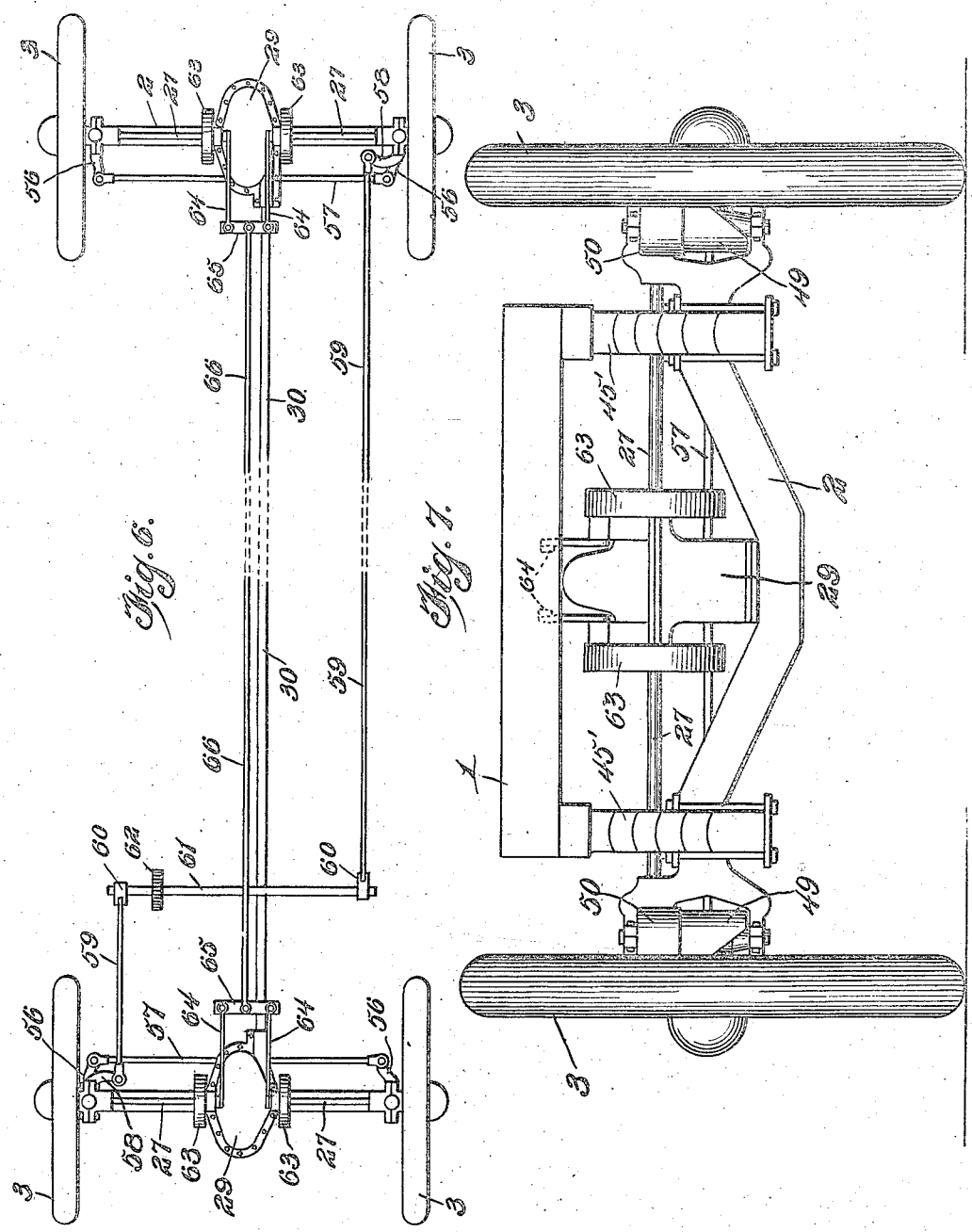

UNITED STATES PATENT OFFICE.

JOSEPH SCHMIT, OF LANSING, MICHIGAN.

DRIVING AND STEERING MECHANISM.

1,388,004.   Specification of Letters Patent.   Patented Aug. 16, 1921.

Application filed June 26, 1918. Serial No. 242,060.

*To all whom it may concern:*

Be it known that I, JOSEPH SCHMIT, a citizen of the United States, residing at Lansing, in the county of Ingham and State of Michigan, have invented new and useful Improvements in Driving and Steering Mechanisms, of which the following is a specification.

This invention relates to driving and steering mechanisms for automobiles and similar vehicles, the main object of the invention being to provide a simple, reliable, compact and powerful driving mechanism for imparting direct driving motion to the wheels of a vehicle.

Another object of the invention is to provide a driving mechanism which is applicable to drive either the fore wheels or the hind wheels, or for driving all four wheels, as desired.

Still another object of the invention is to provide a driving mechanism which is readily accessible for cleaning, repairs or renewal of parts, and which includes means for properly lubricating the working parts and protecting the same from the access of dirt, dust, moisture and other foreign substances.

Still another object is to provide an improved steering mechanism and means for mounting the parts to secure certain advantages.

With these and other objects in view, the invention consists of the features of construction, combination and arrangement of parts, hereinafter fully described and claimed, reference being had to the accompanying drawings, in which:—

Figure 1 is a sectional front elevation of the front or rear wheels of a vehicle showing the application of the invention in connection with one type of steering gear and mode of mounting the forward end of the vehicle frame.

Fig. 2 is a sectional plan view of the same.

Fig. 3 is a detail view of one of the steering gears shown in Figs. 1 and 2.

Fig. 4 is an enlarged vertical section through one end of the front axle and hub of one of the front wheels, and showing the driving mechanism and steering gear associated therewith.

Fig. 5 is a similar view of a front or rear axle and wheel hub, showing a different mode of application of the invention thereof.

Fig. 6 is a top plan view showing the embodiment of the invention in a four-wheel driving and steering construction.

Fig. 7 is a view in end elevation of one of the sets of wheels shown in Fig. 6.

Fig. 8 is a view showing a modification in the wheel drive gearing.

Referring particularly to Figs. 1 to 4, inclusive, of the drawings, 1 designates the frame of the vehicle, 2 the front axle and 3 the front driving and steering wheels. As shown, the wheels 3 are connected with the ends of the axle 2 by the steering knuckles, generally indicated by 4, with each of which knuckles is combined a driving mechanism for the wheel mounted thereon, as hereinafter described. At each end the axle 2 is formed to provide an upper fork arm 5 and a lower fork arm 6, and these fork arms are formed with half-bearings 7 for coöperation with similar bearings 8 on separate bearing blocks 9 to provide complete journal bearings for the upper and lower ends of the vertically disposed knuckle pin 10. The bearing section 9 is detachably connected with the bearing portions of the fork arms 5 and 6 by bolts or other suitable fastening members 11.

The knuckle pin 10 is provided with an outwardly projecting sleeve 12, which is integral therewith, said pin and sleeve being preferably composed of a single forging. The sleeve 12 forms a bearing for the wheel driving spindle 13 which extends therethrough and is threaded or otherwise connected at its outer end, as indicated at 14, with the hub cap 15 of the wheel 3, the hub body 16 of which and the cap member 15 are mounted to revolve upon the sleeve 12, as shown. The cap 15 is fixed to the hub body 16 in any suitable manner, so that positive driving motion from the spindle 13 will be transmitted to the wheel. Raceways 17 are suitably formed and provided between the surfaces of the sleeve and the hub body and cap to receive suitable anti-friction bearings 18 of either the roller or ball type, roller bearings being conventionally shown in the present instance, a similar raceway 19 and bearings 20 being also provided between the inner end of the sleeve 12 and inner end of the axle spindle 13.

Mounted upon the inner end of the axle spindle 13 is a bevel gear 21 which meshes with the lower toothed face 22 of a double bevel gear 23 journaled to rotate on a bearing portion 24 formed on the knuckle pin 10, which gear 23 receives motion from a beveled driving pinion 25 which meshes with the upper toothed face 26 of said gear 23. By this construction it will be seen that power will be transmitted through the gears 21, 23 and 25 to drive the axle spindle 13 for communicating driving motion to the wheel 3, and that in such action the gear 23 turns loosely upon the bearing portion of the knuckle pin 10, thus permitting of a constant driving motion while at the same time allowing free turning motion of the knuckle pin in the adjustment of the wheel 3 for steering actions.

The pinions 25 which transmit motion to the respective driving and steering wheels 3 are mounted upon the divided sections 27 of a transversely disposed wheel driving shaft arranged above the axle 2 and journaled at their outer ends in the upper fork arms 5, anti-friction bearings 28 of either of the types previously described being preferably provided between the bearing surfaces. The inner ends of the shaft sections 27 are associated with and driven by a suitable type of differential gearing, generally indicated at 29, and which receives motion from the main drive shaft 30 driven from the transmission gearing (not shown) in the usual manner. Inclosing the shaft sections 27 between the forked ends of the axle and the differential gearing are hollow shafts or sleeves 31 and 32, which form a partial housing for the said shaft sections 27 and also serve as transmission shafts of a steering gear mechanism. These shafts 31 and 32 are journaled in suitable bearings 33, with certain of which bearings are coupled the torque rods 34, and said shafts 31 and 32 carry at their inner ends gear elements 35 and at their outer ends gear pinions 36.

The gear pinions 36 are preferably provided with pin teeth which mesh with openings 37 in gear segments 38 fixed to the wheels 3, whereby motion may be imparted to the wheels to transmit steering movements thereto, the wheels turning with the knuckle pins 10 which, in this action, rotate in the bearings on the fork arms 5 and 6. In this action also, it will be obvious that the gears 21 will swing with the wheels, and that differential motion of the wheels will be transmitted through the action of the differential gearing.

The gear elements 35 are provided on their inner faces with sockets or openings 39 which mesh with the pin teeth of a steering gear 40 disposed between said gear elements. This gear 40 is mounted upon a steering shaft, composed of two telescopically connected shaft sections 41 and 42, coupled by one or more universal joints 43 with the steering post 44, whereby the shafts 31 and 32 may be operated to communicate steering motion to the wheels 3 in an obvious manner. The telescopic construction of the steering shaft obviously permits said shaft to lengthen and shorten to accommodate itself to the vertical play of the vehicle frame 1, while the universal joint or joints 43 also permits said steering shaft to accommodate itself to other movements of the vehicle frame without interfering in any manner with the steering adjustments. In the construction disclosed in Figs. 1 and 2, the front end of the body is mounted upon a transversely disposed semi-elliptical suspension spring 45 connected by hangers 46 with suspension arms 47 on the ends of the axle. By this construction the spring is disposed at a sufficient elevation and is so formed as to provide for the convenient mounting of the steering gear on the front axle, such arrangement of the spring also avoiding any projection of the spring beyond the front of the axle, so that the wheels 3 may be turned throughout a very wide arc, to extreme positions in which they are substantially parallel with the axle 2.

Each set of gearing between the drive shaft sections 27 and the respective wheels 3 is preferably inclosed within a casing 48, composed of sheet metal or other suitable material. This casing consists of horizontally divided sections, a lower section 49 suitably fixed to the wheel hub to turn therewith, and an upper section 50 suitably connected with the end of the axle to remain in a stationary position. The lower section 49 of the casing is provided with a centrally disposed vertical partition 51 separating the lower portion thereof into a lubricating chamber 52, in which oil or other lubricant for the gears may be contained, and a trap chamber 53 designed to receive and hold any dirt or moisture which may find its way into the casing, thus keeping such dirt or moisture separate from the lubricant and preventing contamination of the latter. The casing sections have a suitable dust and moisture proof connection at their meeting ends, which is designed to exclude such foreign substances, while at the same time permitting turning movement of one casing section upon the other. In the present instance this connection is shown in the form of a groove or channel 54 provided upon the lower edge of the section 48 to receive the upper edge 55 of the section 49 and permit the latter to turn therein.

It is to be understood that in the application of the invention to a front-wheel drive only, the type of front-wheel drive disclosed may be employed in conjunction with any suitable type of rear-wheel mounting. Such construction may also be employed in connection with any suitable type of rear-wheel drive, in employing a four-wheel drive gearing, but, in the use of both front and rear wheel drives, separate clutches for these drives may be used for throwing the rear-wheel drive out when the front wheels 3 are turned to the limit for a very short turning motion.

In Fig. 5 I have shown the application of the invention embodying my improved type of wheel drive to one of the rear wheels of a vehicle, it being understood that the construction is duplicated with respect to both rear wheels. In this view I have also shown the use of a steering mechanism for the rear wheels, which may correspond with that previously described. In this adaptation of the gearing the position of the knuckle pin 10' is reversed, the pinion 23' and bearing surface 24' being arranged upon the lower end of the pin and below the spindle 13' and gear member 21'. In this construction also the end 14' of the spindle may be of angular or other suitable form and keyed to the hub cap 15', which is suitably fixed to the wheel hub. A further change consists in extending the shaft sections 27' through a hollow axle 2' upon which the steering knuckle fork arms 5' and 6' are mounted. The construction is otherwise generally the same as that previously described with reference to the front-wheel drive, except that the shaft 31 may be solid and the lower section 50' of the casing 48' is mounted upon the lower fork arm, while the upper section 49' of said casing is mounted upon the wheel hub. In this construction also the partition 51 and grooved portion 54 are dispensed with, the ends of the casings having a simple telescopic connection. I have also indicated in dotted lines in Fig. 5 that the outer end of each shaft section 31' of the steering gear may be mounted within a bearing 33ª formed upon the upper knuckle fork in addition to being journaled in the bearings 33', but in such case such bearings 33' may be dispensed with.

In Figs. 6 and 7 of the drawings I have shown a construction wherein the frame 1 is mounted upon longitudinally extending springs 45', and also in which a different type of steering mechanism is used. In this construction the steering knuckles are provided with the usual crank arms 56 coupled for movement in unison by the connecting rod 57, one of said knuckles being also provided with a crank arm 58 which is coupled by a connecting rod 59 with a crank arm 60 upon one end of a horizontal transverse steering shaft 61. As shown, the shaft 61 is provided with two crank arms 60 arranged at opposite angles and which are respectively coupled to the connecting rods 59 of the steering devices for the front and rear wheels. On the shaft 61 is a worm gear or other suitable device 62 which meshes in practice with the worm or other suitable device upon the steering post, whereby steering motion may be imparted simultaneously to both sets of wheels. It will be understood of course that the type of wheel drive gearing previously described and shown in Figs. 1 to 5, inclusive, is employed as illustrated in Figs. 6 and 7 in connection with a different type of steering gear as disclosed. In Figs. 6 and 7 I have further shown the use of a different type of brake mechanism in which brake drums 63 are shown as mounted upon the shaft sections 27 of the respective wheel drives, said drums having arranged therein the usual brake shoes coupled by crank mechanism and connecting rods 64 with evener levers 65, which levers are coupled by a rod or rods 66 connected in practice with the primary brake mechanism of the vehicle, whereby the brake shoes may be thrown into and out of action at will.

It will thus be understood, that the wheel drive gearing may be mounted for use in connection with different frame suspensions, types of steering gear, and upon the front axle, rear axle or both axles at will, according to the nature of the particular number of wheel drives to be employed. The advantage of my construction is that it provides a simple type of drive mechanism which will impart positive driving motion to the wheel, which may be effectually inclosed and protected from injury and the access of dirt, moisture and other foreign substances, and which will operate in a highly efficient manner without interfering in any respect with the steering motions of the wheel.

In practice I preferably construct the sleeves or hollow shafts 32 in sections provided with coupling flanges 32ª united by screws, bolts or other suitable fastenings. By this construction the members of each sleeve section may be adjusted to regulate the length of the sleeve section, so that proper adjustment of the gears 36 may be made for coöperation with the segments 37 in setting the wheels 3 in proper relation for steering action. If desired, washers or other spacing devices may be disposed between the sets of flanges 32ª, when required to space the flanges to lengthen the shafts 32 to any desired degree.

While I have described the construction shown in Figs. 1 to 4, inclusive, as being applied to a front axle, it is to be understood that the construction disclosed therein may be applied with equal facility to a rear axle. In applying the wheel drive disclosed in this construction to a rear axle it will, of course, be understood that the steering gear may be omitted where the front wheels alone are to be used for a steering action, or that, if both the front and rear wheels are mounted for steering actions, such a type of steering mechanism as that disclosed in Figs. 6 and 7 may be employed. Similarly while I have described the gearing construction shown in Fig. 5 as applied to a rear axle, it is to be understood that such structure may be applied to a front axle, and that any suitable type of steering mechanism may be employed therewith.

In the modification shown in Fig. 8 I have disclosed means for throwing the wheel driving gearing into and out of action as desired, showing the application as applied particularly to the form of gearing shown in Fig. 4, although it is to be understood that an equivalent construction may be employed in connection with the gearing shown in Fig. 5. As illustrated in Fig. 8, the gear 25 is independent of the shaft section 27, being carried by a sleeve 67 which is feathered or otherwise suitably constructed to slide upon and rotate with the shaft section 27, and is adapted to be manipulated by shifting mechanism, partly indicated at 68, whereby the gear 25 may be thrown into and withdrawn partially out of engagement with the gear 23. When the gear 25 is partially withdrawn from engagement with the gear 23, the gear 23 will be permitted to rise on the knuckle pin 10 sufficiently to withdraw it from engagement with the gear 21, thus allowing ample freedom of motion of the spindle 13 to permit the wheels to be turned for a steering action without interference from the driving mechanism, when desired. If desired, a spring may be employed to lift the gear 23 out of engagement with the gear 21 when gear 25 is partially moved out of engagement with gear 23.

Having thus fully described my invention, I claim:—

1. In a wheel drive for motor vehicles, the combination of an axle, a knuckle pin included on the axle and having a sleeve extending therefrom and integral therewith, and also provided with a circumferential journal portion between one of its ends and said sleeve, a wheel driving spindle journaled in the sleeve, a wheel having a hub fixed to said spindle and mounted to rotate upon the sleeve, a gear carried by the spindle, a gear meshing therewith and slidably and rotatably mounted upon the circumferential bearing surface of the knuckle, a drive gear meshing with the second named gear, and means for advancing and retarding said drive gear to permit the second named gear to have a sliding motion on the knuckle.

2. In a wheel drive for motor vehicles, the combination of an axle, a knuckle pin journaled upon the axle, a wheel driving spindle journaled upon said pin, a wheel fixed to the pin and mounted to rotate upon a portion of the latter, a drive shaft, intermeshing gears between the drive shaft and spindle, a two-part casing having its parts respectively connected with the knuckle pin and axle and inclosing the aforesaid gears, and a partition sub-dividing the lower portion of said casing to form a lubricant chamber and a collecting trap.

3. In a device of the character described, the combination of an axle, a steering knuckle upon the axle, a wheel driving spindle carried by the steering knuckle, a gear upon said spindle, a transmission gear slidably and rotatably mounted on the knuckle pin and meshing with the first named gear, a drive shaft, a drive gear carried by said shaft and meshing with the transmission gear, and means for withdrawing the driving gear to a position to permit the transmission gear to move out of mesh with the gear upon the spindle.

4. In a device of the class described, the combination with an axle having a steering knuckle, of a pin rotatable in said knuckle, a wheel driving gear rotatably carried by said pin, a double gear rotatable upon said pin, the said double gear being slidably mounted upon said pin so that one of the gear faces thereof may engage with or be disengaged from the said wheel driving gear, a drive shaft, and a gear carried by said shaft and adapted to be moved into or out of mesh with the other face of said double gear.

5. In a wheel drive for motor vehicles, the combination of an axle, a knuckle pin having end portions removably journaled upon the axle and having a sleeve integral with and extending from the central portion thereof, said knuckle pin being further provided between said sleeve and one of its end portions with a circumferential bearing portion, a wheel driving spindle journaled to rotate within the sleeve, a gear element carried by the spindle, a power driven gear, and an intermediate gear carried by the circumferential bearing portion of said knuckle pin, said intermediate gear having oppositely disposed gear faces in mesh with complemental faces of said power driven gear and the gear on said spindle.

In testimony whereof I affix my signature.

JOSEPH SCHMIT.